A. BORCHERS.
Clod-Breakers.

No. 156,656.                                   Patented Nov. 10, 1874.

Witnesses
John L. Boone
C. M. Richardson

Inventor
Addo Borchers
by Dewey & Co
Atty's

UNITED STATES PATENT OFFICE.

ADDO BORCHERS, OF ALBANY, OREGON.

IMPROVEMENT IN CLOD-BREAKERS.

Specification forming part of Letters Patent No. 156,656, dated November 10, 1874; application filed March 3, 1874.

*To all whom it may concern:*

Be it known that I, ADDO BORCHERS, of Albany, Linn county, State of Oregon, have invented an Improved Clod-Breaker; and I do hereby declare the following description and accompanying drawings are sufficient to enable any person skilled in the art or science to which it most nearly appertains to make and use my said invention or improvement without further invention or experiment.

My invention relates to an improved drag or clod-breaker for leveling and pulverizing plowed ground preparatory to seeding it.

Figure 1:
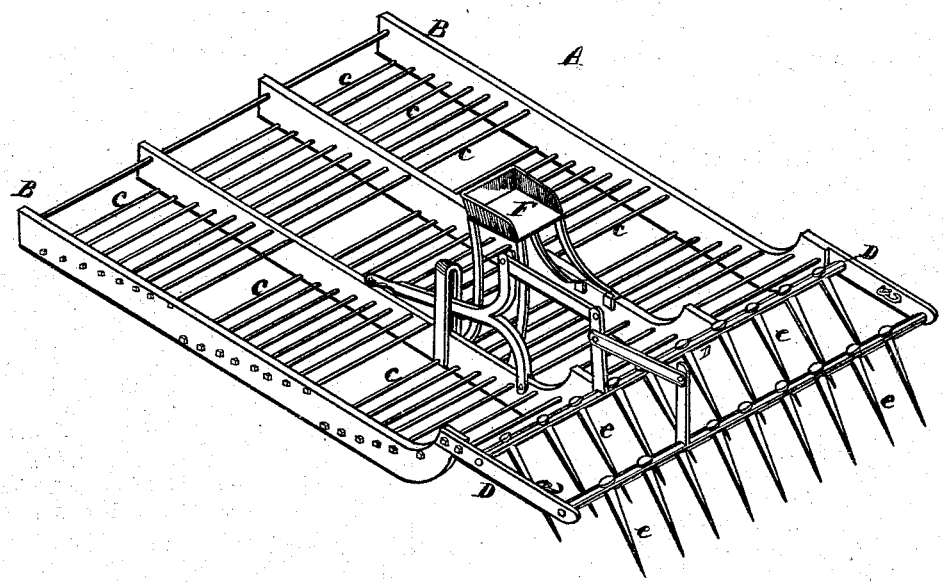
Figure 2:
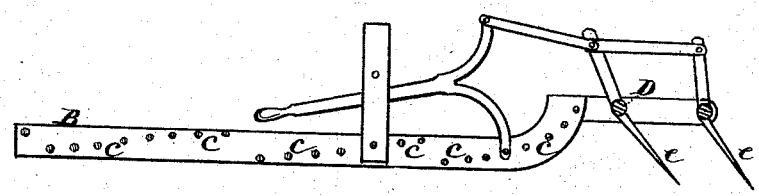

In the drawings accompanying this specification, Figure 1 is a perspective view of my clod-breaker. Fig. 2 is a longitudinal section.

A is a frame, which is composed of two or more parallel bars or boards, B, standing edgewise, which are placed at the desired distance apart and united at each end, so as to form a square or other conveniently shaped frame. These boards or bars B are curved upward at the forward end similar to the runners of a sleigh, so that they will not push the earth along in front of them when the drag is drawn over the ground. Transversely across the frame A I arrange horizontally one or more series of wires or iron rods, so that each series will pitch downward toward the rear of the frame. Each of these series is composed of a number of wires or rods, $c\ c\ c$, stretched parallel with each other across the frame A, passing through the bars or timbers B at a short distance apart, so as to leave a space between each two wires, thus forming one or more inclined drags, which will ride upon the clods and force them through the meshes between the wires. When more than one series are used the portions of the clod which are forced between the first wires will roll down and be caught by the second series, and so on until it is thoroughly pulverized. In front of the frame is a transverse timber, D, having spikes or teeth $e$. These teeth penetrate into the plowed ground and lift the large clods to the surface in advance of the wire inclines, so that they will be subject to the action of the wire. A seat, F, is mounted upon the frame, upon which the driver can ride, and thus use his weight to press the drag upon the ground.

By this arrangement I provide a clod-breaker and harrow combined that will effectually reduce a plowed field to a smooth and pulverized condition; also, by my arrangement of the open wires the soil is allowed to pass freely through them upward, while the wires themselves cut their way down into the clods.

The drag or clod-breaker will last a long time, and will save a great portion of the time and trouble usually required to put a field into the proper seeding condition.

Having thus described my invention, what I claim, and desire to secure by Letters Patent, is—

The frame A, having one or more inclined series of open parallel wires, $c\ c$, in combination with the timber D with teeth $e$, substantially as and for the purpose above described.

In witness whereof I hereunto set my hand and seal.

ADDO BORCHERS. [L. S.]

Witnesses:
   GEO. H. JONES,
   J. QUINN THORNTON,